2,899,413

CATALYTIC POLYMERIZATION OF α-OLEFINS TO SOLID POLYMERS OF IMPROVED CRYSTALLINITY AT INCREASED RATES

Hugh J. Hagemeyer, Jr., and Marvin B. Edwards, Longview, Tex., assignors to Eastman Kodak Company, Rochester, N.Y., a corporation of New Jersey No Drawing. Application January 26, 1956
Serial No. 561,662

9 Claims. (Cl. 260—88.1)

This invention relates to the catalytic polymerization of normally gaseous α-monoolefins to solid polymers having an unusually high degree of crystallinity and at polymerization rates much higher than were obtainable by catalytic processes known heretofore. The invention is particularly concerned with the polymerization of ethylene, propylene, or mixtures thereof to form solid high density polymers at greatly increased rates, the polymers also exhibiting a higher degree of crystallinity than normally exhibited by the solid high density polymers prepared by other catalytic processes.

For many years, the Friedel-Crafts type catalysts, such as aluminum chloride, were used to polymerize olefins to form low molecular weight liquid polymers. Finally, in 1939, Fawcett et al. disclosed in U.S. 2,153,553 that ethylene could be polymerized to a solid waxy polymer by the use of pressures in excess of 500 atmospheres and usually of the order of 1000–2000 atmospheres. The polyethylene thus formed has become a very valuable article of commerce and is characterized by its flexibility and film forming properties. Such high pressure polyethylene possesses a rather high degree of chain branching, however, and hence has a relatively low softening temperature, a low density and relatively low crystallinity.

More recently a number of catalytic processes have been proposed for preparing solid polymers of improved density and crystallinity characteristics. One of the most successful methods of obtaining such solid high density polymers at relatively low temperatures and pressures without the concomitant formation of oily or waxy by-products is disclosed in the copending application of Shearer, Hagemeyer and Edwards, Serial No. 559,537, filed January 17, 1956. As disclosed in such application, it was found that unusually good results were obtained employing three-component catalyst mixtures composed of a group II or III metal such as aluminum or zinc, a group III metal halide, preferably aluminum chloride, and a compound of a transition metal from subgroup IV, V or VI of the periodic table, preferably a titanium tetrahalide or tetraalkoxide provided the concentration of the aluminum halide is in the range of from 0.1 to 2.0 molar equivalents per gram atom of the metal. The product thereby formed consisted of high molecular weight solid, crystalline polymer containing no liquid or waxy polymers such as are often encountered in catalytic processes. It is desirable, however, to achieve higher polymerization rates if possible, to facilitate the large scale commerical manufacture of such materials as high density polyethylene, polypropylene, ethylene-propylene copolymers and the like. It is also desirable, from the standpoint of rigidity and softening temperature, to achieve crystallinities at as high a percentage as possible.

It is therefore an object of this invention to provide a new and improved process for effecting conversion of normally gaseous α-monoolefins, such as ethylene or propylene, or mixtures thereof, to high molecular weight, solid polymers exhibiting an unusual degree of crystallinity at polymerization rates considerably higher than could be achieved by other catalytic processes. Another object of the invention is to provide a new and improved process for catalytic polymerization of ethylene and similar α-monoolefins of 2–10 carbon atoms to high density, solid polymers employing combinations of readily available catalytic components which are free of the objectionable handling problems characteristic of the pyrophoric catalysts often employed. Another object of the invention is to greatly increase the polymerization rates of the catalytic mixtures of a metal, a metal halide and a transition metal compound by the inclusion therewith of an additional component which increases the polymerization rate and thus the yield per unit time many fold without detracting from the other advantages characteristic of the catalyst system. Another object of the invention is to facilitate the commercial manufacture of high density, highly crystalline polyolefins by providing an economical, high conversion process which can be readily carried out at pressures as low as atmospheric pressure and at temperatures below 200° C. with polymerization rates which greatly increase the space-time yield of polymer. Other objects will be apparent from the description and claims which follow.

These and other objects are attained by means of this invention wherein it was found unexpectedly that the polymerization of normally gaseous α-monoolefins, either singly or in admixture, to high molecular weight, highly crystalline solid polymers by means of three-component catalyst mixtures of a group II or III or subgroup II metal, a group III metal halide and a subgroup IV, V or VI transition metal compound could be greatly improved by the inclusion in the catalytic mixture of an alkali metal fluoride in an amount of at least one molar equivalent per gram atom of such metal. The improved results characteristic of this invention are of particular importance in catalytic mixtures consisting of the alkali metal fluoride in combination with aluminum metal, aluminum halide, and a titanium compound wherein the aluminum halide amounts to from 0.1 to 2 molar equivalents per gram atom of aluminum metal and the alkali metal fluoride amounts to at least 1 molar equivalent per gram atom of aluminum metal. The inclusion of the alkali metal fluoride, which is preferably sodium fluoride for best results, results in polymer yields of at least four times the yield obtained without the alkali metal fluoride being present. In addition, the degree of crystallinity of the polymers thereby obtained is also increased as evidenced by the fact that polypropylene prepared according to the present invention possesses a degree of crystallinity of 75–80% whereas the polypropylene prepared heretofore was either largely amorphous or contained very sizable proportions of amorphous polymer. The invention also yields polyethylene of greater crystallinity than was ordinarily obtained heretofore even by the best catalytic processes which minimized chain branching. The reason why the alkali metal fluoride increases the polymerization rate so greatly and also increases the degree of crystallinity is not well understood, and the invention will not be limited by any theory which might be advanced by way of explanation. The increase in the rate of polymerization is readily apparent when employing as little as one mole of alkali metal fluoride per gram atom of aluminum or zinc, but the acceleration of rate is more pronounced when higher amounts of the alkali metal fluoride such as 4 to 10 molar equivalents are employed. The acceleration in polymerization rate is particularly pronounced at concentrations of about 6 molar equivalents of the fluoride per gram atom of metal.

The four-component catalysts embodying this invention are of particular utility because of the fact that the polymer formed consists entirely of the desired solid high molecular weight, highly crystalline polymer without the concomitant formation of low molecular weight waxes and oils. When this characteristic is combined with the exceptional yields obtained in accordance with this invention, a truly commercial process is obtained which can be readily carried out on a large scale. The elimination of low molecular weight polymers is dependent upon the use of the aluminum halide in amounts not greater than 2 molar equivalents per gram atom of aluminum or zinc metal. When higher concentrations are employed, the formation of liquid or waxy low molecular weight products becomes very pronounced. Although the amount of aluminum halide must be not higher than 2 molar equivalents, it can be as low as 0.01 molar equivalent or lower per gram atom of metal and still give the highly advantageous results characteristic of the present invention. The concentration of the sodium fluoride or other alkali metal fluoride can also be varied rather widely as indicated but the reason why the alkali metal fluorides give such increased polymerization rates and increased crystallinity of product is not understood. It has been found, however, that the alkali metal fluorides accelerate the polymerization rate to a much higher degree than do any of the other alkali metal compounds which have been tested. Although the potassium or lithium fluorides can be used, the invention is preferably carried out employing sodium fluoride for optimum results. The mole ratio of the aluminum halide to the titanium compound is also important in its effect on the molecular weight, melt index and other properties of the polymer. Mole ratios of aluminum halide to titanium compound greater than 1 lead to formation of high molecular weight, low melt index polymer. Mole ratios of aluminum halide to titanium compound of less than 1 yield polymers of lower molecular weight and higher melt index.

In practicing the invention, the metal employed is desirably aluminum since the combinations including aluminum show considerably greater activity than do the compositions wherein the metal is a different metal from group II or III or subgroup II of the periodic table such as zinc or magnesium. Of the other metals, zinc is preferably employed as an alternative for aluminum and does give good yields of solid polymer. The metal halide employed is also desirably an aluminum halide with aluminum chloride being preferred. Somewhat less advantageous results are obtained using aluminium bromide or aluminum iodide. The transition metal compound is desirably a titanium or zirconium compound, with the titanium tetrahalides or tetraalkoxides wherein each alkoxide group contains 1–18 carbon atoms being preferred. As has been indicated, sodium fluoride is preferably employed as the alkali metal fluoride, although potassium or lithium fluorides can be used. The empirical nature of the catalysis is evidenced by the fact that the individual components of the catalyst mixture are each unsuccessful as catalysts for forming solid polyolefins. Furthermore, aluminum chloride alone gives only oil products as do mixtures of aluminum chloride and aluminum metal. As has been indicated, the relative proportions of the aluminum chloride and the metal are also quite critical in obtaining the desired solid polymer.

A particular advantage of the invention is that it employs, as catalyst components, materials which are readily available, inexpensive and easy to handle in commercial practice since they do not ignite spontaneously on contact with air. This latter is a particular advantage when dealing with large scale operations with the highly flammable gaseous monoolefins. The catalyst systems included within the scope of the invention include, in the preferred embodiments, any of the four-component catalyst mixtures of aluminum or zinc metal, .01–10 preferably .1–2 molar equivalents of titanium tetrahalide or tetraalkoxide, not more than 2 molar equivalents, and preferably 0.01–2 molar equivalents, of aluminum halide per gram atom of aluminum or zinc metal, and 1–10 and preferably 1–6 molar equivalents of alkali metal fluoride per gram atom of aluminum metal. Larger amounts of titanium compound can be used but are not necessary and hence less desirable from the economic standpoint. The titanium compounds can be replaced by zirconium compounds with good results, although the titanium compounds are preferably employed in commercial practice. The molar concentration of titanium compound is desirably less than the molar concentration of aluminum halide for production of high molecular weight, low melt index polymers.

In practicing the invention, any form of aluminum or zinc metal can be used although it is preferably in flake or finely divided form for optimum activity, rapid polymerization and high yield of polymer. When granular aluminum of commerce is employed, it is desirable to clean the surface of the granules with an acid or acid mixture, such as a mixture of nitric and hydrofluoric acids, or with a base, or with a reducing agent, for optimum results although this is not essential for use of the granules. It is preferred to use a finely divided aluminum or zinc metal, such as aluminum flakes or zinc powder, since the forms available commercially need not be cleaned for rapid polymerization and high yields of polymer.

When a titanium halide is employed as the titanium compound, it is conveniently the readily available titanium tetrachloride although the other titanium tetrahalides such as the tetrabromide or tetraiodide can also be used with good results. Alternatively, any of the titanium tetraalkoxides can be employed which contain 1–18 carbon atoms in each alkoxide group, such as titanium tetramethoxide, titanium tetraethoxide, titanium tetraisopropoxide, titanium tetrabutoxide, titanium tetraisobutoxide, tetra 2-ethylhexyl titanate tetrastearyl titanate and the like. The aluminum halide which is employed in the four-component mixtures is desirably aluminum trichloride although aluminum tribromide can be used. The concentration of the titanium compound relative to the aluminum or zinc metal is subject to considerably greater variation than is the concentration of the aluminum chloride, but it is preferred to operate within the range of .01–10 and desirably .1–2 molar equivalents of titanium compound per gram atom of aluminum or zinc metal for optimum results.

The inventive process is carried out in liquid phase in an inert organic liquid, and preferably in inert liquid hydrocarbon vehicle, and the removal of catalyst is facilitated by operating below the melting point of the polymer. The process proceeds with excellent results over a relatively wide temperature range with temperatures of 20°–200° C. being preferably employed, and particularly good results being obtained in the range of 40–160° C. The preferred temperature range is 90–120° C. The pressure can be varied as desired, with pressures as low as atmospheric pressure being operable. Generally speaking, however, it is desirable to employ a pressure in the range of 0–1000 p.s.i.g. with pressures of from 10 to 1000 p.s.i.g. being preferred for optimum yields. In some cases, higher pressures such as are employed in the conventional high pressure processes can be used but are usually not necessary. Thus, pressures of as much as 20,000 p.s.i.g. or higher can be used in some instances. The liquid vehicle employed is desirably one which serves both as a liquid medium and as a solvent for the solid polymerization products at the temperature of polymerization. The great increase in polymerization rate with increasing pressures makes the use of pressures of 300–500 p.s.i. desirable.

The invention is applicable for polymerizing any of the well known α-monoolefinic hydrocarbons and preferably those containing from 2 to 10 carbon atoms. In most cases, the invention is particularly applicable for polymerizing ethylene, propylene or mixtures thereof, although any of the monoolefins can be used or any mixtures of monoolefins depending upon the type of product desired. When ethylene is employed as the monomer, the polyethylene obtained has a softening point or fusion point greater than 130° C. which means that products prepared therefrom can be readily employed in contact with boiling water without deformation or other deleterious results. The polymers embodying this invention have molecular weights greater than 1000 and usually greater than 10,000. The achievement of extremely high molecular weights does not present a problem employing the catalytic process herein described, and molecular weights even greater than 1,000,000 can be readily attained. The high molecular weight, high density polyethylenes of this invention are insoluble in solvents at ordinary temperatures but are partially soluble in such solvents as xylene, toluene or tetralin at temperatures of about 100° C. With the exception of the compounds of extremely high molecular weight, the polyethylenes obtained according to this invention are soluble in tetralin at 145° C. These solubility characteristics make is possible to carry out the polymerization process under conditions wherein a polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosities as measured in tetralin at 145° C. may be varied from about 0.5 or lower to 5.0 or higher. Melt indices as measured by the standard ASTM method may be varied from about 0.01 to 100 or even higher.

Thus, polyethylene prepared by means of this invention and having a molecular weight in the range of 50,000 exhibits a density above 0.95, a softening temperature of at least 130° C., a tensile strength of 3000–5500 p.s.i. and a stiffness in flexure at 5% deflection (ASTM test D747–50) of at least 50,000 p.s.i.

The polyolefins prepared in accordance with the invention can be molded or extruded into flexible plates or films. The products can be extruded to the form of pipe or tubing of greater rigidity than the usual high pressure polyethylene or can be injection molded into a great variety of articles. The polymers can also be cold drawn into ribbons, bands, fibers or filaments of high elasticity and rigidity. Fibers of high strength can be spun from the molten polyethylene obtained according to this process. The polypropylene prepared in the same way also has a very high degree of crystallinity and a very high density, and the polymers of other α-olefins have similarly improved properties. The process of the invention can also be employed to effect the copolymerization of ethylene with other polymerizable α-monoolefins and particularly with propylene. Other monoolefins which are suitably employed either alone or in admixtures include such materials as n-butylene, isobutylene, 1-pentene, 1-decene, and similar α-monoolefins. In some cases, it is desirable to prepare copolymers of the α-monoolefins in order to modify the properties for particular uses such as in molding or extrusion applications. Thus, copolymers of 5–95% ethylene with 95–5% propylene are desirably prepared in many cases.

The catalyst mixtures embodying the invention have several important advantages over the prior art processes. One advantage resides in the fact that the conversion of the olefins, and particularly ethylene or propylene or mixtures thereof, to solid polymers of high molecular weight is essentially complete. By-products such as the low molecular weight oils, aromatics or greases are not formed. One of the particular advantages is the faster polymerization rate which is achieved. The inclusion of the alkali metal fluoride produces a pronounced acceleration of the rate of reaction. The economic advantages of the higher space-time yields resulting therefrom are obvious. Another advantage of the invention is that the process is operative at relatively low temperatures, and employing considerably lower catalyst concentrations than are ordinarly used, in prior art processes. These factors, together with the prevention of by-product formation by the use of controlled amounts of aluminum chloride, contribute to the production of a cleaner polymer which is more suitable for use as a commercial plastic material. The melt index and average molecular weight of the product can be controlled within rather narrow limits by suitable regulation of the relative proportions of the various catalyst components. This provides a simple and sensitive control over the nature of the polymer produced. The catalyst mixture is relatively stable and requires no special handling techniques. The components of the catalyst system are not subject to rapid inactivation by air and do not ignite on contact with air. The superior stability of the catalyst systems of this invention to accidental inactivation permits more precise control of catalyst concentration. The polymers produced according to the process of the present invention are of superior quality. The polyethylenes, for example, are composed almost exclusively of straight chain hydrocarbons and have higher melting points, tensile strengths, stiffness and density than materials commercially available at this time. One particular characteristic of the products embodying the invention is their unusually high crystallinity. Thus, polypropylene prepared according to the present invention has a crystallinity of 75–80%, whereas the polypropylene prepared by previously known processes contains a very high amount of amorphous material.

The process embodying the invention can be carried out at pressures as low as atmospheric pressure. The increase in polymerization rate with a slight increase in the pressure of the gaseous α-monoolefin is so great, however, that it is generally preferred to operate at pressures of 200–500 p.s.i. in commercial practice. Pressures of the order of 10–1000 p.s.i. can be employed with good results and allow considerable economy over the conventional high pressure processes which operate in the range of 1000–2000 atmospheres in most cases. When the polymerization is carried out at atmospheric pressure, it can be effected simply by bubbling gaseous monoolefin through a stirred catalyst mixture. In such cases, it is generally advantageous to heat the catalyst components together, except for the titanium compound, at 130–190° C. under an ethylene pressure of 5–10 atmospheres for several minutes. The mixture, after cooling and addition of the titanium compound, is then capable of rapid polymerization at very low pressures and temperatures between 20 and 200° C. can be used with temperatures of 40–160° C. being preferably employed, and the optimum temperature range being 90–120° C. The polymerization is conveniently carried out in a rather dilute slurry of the catalyst components in an inert solvent. The concentration of catalyst in the solvent can be from about 0.01% to about 10% with the preferred range being 1–4%. Removal of the catalyst from the product is generally facilitated if the polymerization is carried out at temperatures below the melting point of the polymer. In such cases, the crude polymer is obtained in the form of a finely divided free flowing powder which is easily handled. The molecular weight, melt index and other commercially important properties of the polymer can be controlled by the ratio of catalyst to monomer and more decisively by adjustment of the mole ratio of the various catalyst components. The exact mole ratio to be used will depend upon the properties desired in the final polymer.

Separation of catalyst from the polymer can be accomplished in any desired manner. It is readily accomplished by washing the crude polymer with acidic or basic alcohol solutions when the polymer is obtained in the form of a finely divided powder. If, however, the polymer is formed at temperatures above the melting point and the crude polymer is obtained in the form of large hard pieces, the polymer should be converted to the powder form before removal of the catalyst. This size reduction is conveniently accomplished by solution in a hot aromatic hydrocarbon-alcohol mixture and reprecipitation by cooling of the solution. Polyethylene thus treated is converted to a very fine powder from which the catalyst is readily removed by washing. Of the several alcohol-hydrocarbon mixtures which were employed, mixtures of xylene and 2-ethylhexanol are superior because of their high solvent power for the high melting, high molecular weight polyethylenes produced according to the process. Since the production of by-products such as oils and greases is minimized to trace amounts or completely obviated, the polymer obtained need not be purified beyond removal of the catalyst.

The only limitation on the temperature at which the process can be effected is the decomposition temperature of the catalyst. The pressure employed need be only sufficient to maintain the reaction mixture in liquid form during the polymerization, although moderate pressures are desirable for optimum yield. Since the catalyst mixture employed consists of components which are either readily soluble or readily dispersible in the organic liquid vehicles commonly employed, the uniformity of reaction can be readily controlled. The exact nature of the catalytic action between the components of the mixture is not wholly understood, and particularly the reason why the mixture has such greatly increased activity is not understood.

The polymerization embodying the invention can be carried out batchwise or in a continuous flowing stream process. The continuous processes are preferred for economic reasons, and particularly good results are obtained using a continuous process wherein a polymerization mixture of constant composition is continuously and progressively introduced into the polymerization zone, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The ethylene or other α-monoolefin can be charged to the polymerization mixture either as a pure material or in admixture with other materials such as hydrogen and hydrocarbons such as methane or propane. Ordinarily, relatively pure monomers are employed unless copolymers are desired. When the charged mixture consists of two or more olefins, the product consists of a true copolymer of the monomers rather than a mixture of homopolymers.

In the preparation of the uniform polymers by the continuous flowing stream process, the temperature is desirably maintained at a substantially constant value within the preferred range in order to achieve the highest degree of uniformity. The concentration of the monomer in the vehicle will vary rather widely depending upon the reaction conditions and will usually range from about 2 to 50% by weight, or preferably from about 2% to about 10% by weight based on the weight of the vehicle. Concentrations of monomer of about 3–7% by weight are commonly employed. Higher concentrations of the monomer ordinarily increase the rate of polymerization, but the rates obtained by means of this invention are so high that this is not generally a significant factor. Concentrations above 5–10% by weight are ordinarily less desirable because the polymer dissolved in the reaction medium results in a very viscous solution. The polymerization time can be varied as desired from a period of a few minutes or hours to several days. The acceleration in polymerization rates characteristic of this invention makes it possible to carry out the polymerizations at considerably shorter times than was possible heretofore. When a continuous process is employed, the contact time in the polymerization zone can be regulated as desired. In such cases, it is usually not necessary to employ reaction or contact times much beyond one-half to one hour since a cyclic system can be employed involving precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzenes, isopropyl benzene, ethyl toluene, n-propyl benzene, diethyl benzenes, mono and dialkyl naphthalenes, n-pentane, n-octane, isooctane, methyl cyclohexane, tetralin, decalin, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The invention is illustrated by the following examples of certain preferred embodiments thereof. It will be understood, however, that the examples are illustrative only and are not intended to limit the scope of the invention unless otherwise specifically indicated.

EXAMPLE 1

The improved results achieved by means of this invention are most readily illustrated by the following data of three comparative polymerizations. In Table 1, Example A illustrates the polyymerization wherein the alkali metal fluoride was omitted from the catalyst mixture and the ratio of aluminum chloride to aluminum was greater than the maximum permissible concentration of 2 molar equivalents per gram atom of aluminum. In Example B, a three-component catalyst system of aluminum, aluminum chloride, and titanium tetrachloride was used, but the mixture did not include the alkali metal fluoride. The ratio of the aluminum chloride to the aluminum was 2:1 in accordance with the preferred practice. Example C illustrates the polymerization employing a four-component catalyst in accordance with this invention.

Table 1

|  | Example A $AlCl_3:Al=$ 6:1.1 | Example B $AlCl_3:Al=$ 2.0:1 | Example C $AlCl_3:Al:$ $NaF=2:1:6$ |
|---|---|---|---|
| Temperature, °C | 140 | 110 | 110 |
| Ethylene Pressure, p.s.i. | 500 | 500 | 500 |
| Time, hrs | 2.0 | 2.0 | 2.0 |
| Autoclave capacity, l | 1.8 | 1.8 | 1.8 |
| Heptane solvent, ml | 500 | 500 | 500 |
| Aluminum, g | 1.0 | 0.54 | 0.54 |
| Aluminum chloride, g | 30 | 5.3 | 5.3 |
| Titanium tetrachloride, g | 10 | 3.8 | 3.8 |
| Sodium fluoride, g | 0 | 0 | 5.0 |
| Mole ratio $AlCl_3:Al$ | 6.1 | 2.0 | 2.0 |
| Mole ratio $NaF:Al$ |  |  | 6.0 |
| Solid polymer, g | 35 | 109 | 522 |
| Oils, g | 52 | 0 | 0 |

As can be seen from the data set out in the table, the catalyst mixture of aluminum metal, aluminum chloride and titanium tetrachloride (Example A) wherein a high ratio of aluminum chloride was employed gave low yields of polymer consisting of more oil than solid polymer. When the concentration of aluminum chloride was reduced to 2 molar equivalents per gram atom of aluminum, the three-component mixture shown in Example B gave no oily product at all but only solid polymer. The amount of solid polymer was greater than the total amount of solid polymer and oily by-product contained in Example A. Quite unexpectedly, the four-component catalyst mixture embodying the present invention, as shown in Example C of Table 1, not only gave solid polymer exclusively but the amount of polymer produced in the same time was nearly 5 times as much as that obtained without the alkali metal fluoride and more than 5 times the total amount of both solid polymer and oily by-product obtained by Example A. Thus, it can be seen from the data in the table that the inclusion of the sodium fluoride increased the polymerization rate nearly 5 fold. The polyethylene obtained had a crystallinity averaging above 90%, and the polymer exhibited a softening point above 130° C. The polymer possessed unusual rigidity and was thus of particular utility in forming molded articles wherein rigidity without brittleness is desired. The polymer also formed continuous sheets and films and could be melt spun to form fibers of unusual tensile strength.

EXAMPLE 2

A catalyst mixture prepared from 0.54 g. (0.02 atom) of aluminum powder, 1.3 g. (0.01 mol.) of aluminum chloride, 1.65 ml. (0.015 mol) of titanium tetrachloride and 1.26 g. (0.03 mol) of sodium fluoride in 250 ml. of heptane was charged to an 1800-ml. autoclave. Air in the autoclave was displaced with ethylene and the catalyst mixture was heated to 90° and agitated with ethylene at 200–600 p.s.i. for 6 hours. Polymerization started at once, and fresh ethylene was forced into the autoclave 4 times to restore the pressure to 600 p.s.i. The autoclave was completely filled with solid polyethylene. Catalyst was removed by washing the polymer with boiling water, hot 10% hydrochloric acid in methanol, hot 0.5% sodium methoxide in methanol, and finally hot water. The polyethylene weighed 448 g. and had a melt index of 1.52.

EXAMPLE 3

Ethylene under 300–500 p.s.i. pressure was contacted at 110° C. with a catalyst mixture composed of 0.54 g. (0.02 atom) aluminum powder, 5.3 g. (0.04 mol) of aluminum chloride, 5.0 g. (0.12 mol) of sodium fluoride, and 3.8 g. (0.02 mol) of titanium tetrachloride in 250 ml. of heptane. Consumption of ethylene, as indicated by pressure drop, began immediately and ethylene pressure was restored to 500 p.s.i. each time it fell to 300 p.s.i. After 2.5 hours no more ethylene could be added because the autoclave was completely filled with solid polyethylene. The crude polymer was washed with 1% sodium hydroxide in methanol, and finally with pure methanol to yield 522 g. of solid polyethylene of melt index 0.75.

EXAMPLE 4

A particular advantage of the invention is the ability to form polymers of unusually high crystallinity. This characteristic is particularly pronounced with the monoolefins, such as propylene, which do not ordinarily form crystalline systems as readily as does ethylene. Thus, propylene was agitated for 5 hours at 200–300 p.s.i. pressure and a temperature of 90° C. with a catalyst prepared by mixing 1.0 g. (0.037 atom) of aluminum powder, 5.3 g. (0.04 mol) of aluminum chloride, 3.1 g. (0.074 mol) of sodium fluoride and 1.9 g. (0.01 mol) of titanium tetrachloride in 500 ml. of heptane. The polypropylene was separated from the catalyst as described in Example 3. The yield of colorless polymer was 237 g. The melt index of the polymer was 23, and the polymer had an average crystallinity of 75–80%.

EXAMPLE 5

A mixture of 3.2 g. (0.12 atom) of aluminum powder, 5.3 g. (0.04 mol) of aluminum chloride, 20 g. (0.48 mol) of sodium fluoride, and 0.95 g. (0.005 mol) of titanium tetrachloride in 500 ml. of heptane was charged to an 1800-ml. autoclave. The mixture was contacted with an approximately equimolar mixture of ethylene and propylene at 300–400 p.s.i. and at 90° C. for 6 hours. The crude polymer was heated with 5% hydrochloric acid in methanol, refluxed for 6 hours with a 1% solution of sodium hydroxide in methanol, and finally washed with pure methanol and water. The solid ethylene-propylene copolymer weighed 360 g. and melted at 130–145° C. The melt index was 7.6.

EXAMPLE 6

A mixture of 0.27 g. (0.01 atom) of aluminum powder, 1.3 g. (0.01 mol) of aluminum chloride, 0.42 g. (0.01 mol) of sodium fluoride, and 5.6 g. (0.01 mol) of tetra 2-ethylhexyl titanate in 250 ml. of heptane was charged to an 1800-ml. autoclave. The mixture was contacted with ethylene at 300–500 p.s.i. at 110° for 4 hours. The reaction product was freed of catalyst as described in Example 3. The pure polyethylene weighed 531 g. and had a melt index of 1.9.

Similar results are obtained with the other catalyst mixtures described hereinabove. Thus, when zinc was employed instead of the aluminum powder, solid polymer was formed almost exclusively but the rate of polymerization was lower than that obtained with aluminum. Titanium tetrabromide can be used instead of titanium tetrachloride without greatly affecting either the rate of polymerization or the character of the product. Similarly, such titanium compounds as titanium tetrabutoxide, titanium tetraethoxide, tetrastearyl titanate and similar titanium compounds were used with equally good results. The nature of the reaction vehicle was also varied without affecting the advantageous practice of the process. Such petroleum fractions as Stoddard's solvent, kerosene or gasoline proved entirely suitable. The polymerization also proceeded in the same manner employing toluene, chlorobenzene and other well known inner solvent vehicles. Although the invention is of particular importance in the polmerization of ethylene, propylene, and mixtures thereof, the catalyst mixture also was effective for polymerizing such other normally gaseous α-monoolefins as 1-pentene, 1-hexene, 1-decene and the like. The copolymers of ethylene and propylene were particularly useful as molding compounds and the properties could be varied widely by varying the concentration of the components. Thus, the products varied from the relatively rigid copolymers containing ethylene predominantly to the much more rubbery copolymers wherein propylene was the predominant component. The lack of chain branching characteristic of the polymers obtained in accordance with this invention indicates that the polymerization mechanism varies significantly from the mechanism wherein either liquid or waxy polymers are formed.

The polymers thus obtained can be extruded, mechanically milled, cast or molded as desired. The polymers are sometimes particularly valuable as blending agents with the relatively more flexible high pressure polyethylenes to give any desired combination of properties. The polymers can also be blended with antioxidants, stabilizers, plasticizers, fillers, pigments and the like or mixed with other polymeric materials, waxes and the like. In general, aside from the relatively higher values for properties such as softening point, density, stiffness and the like, the polymers embodying this invention can be treated in similar manner to those obtained by other processes.

Although the invention has been described in considerable detail with reference to certain preferred embodiments thereof, variations and modifications can be effected with the spirit and scope of the invention as described hereinabove and as defined in the appended claims.

We claim:

1. In the polymerization of at least one normally gaseous α-monoolefin to form solid polymer, the improvement in preparing polymer of exceptional crystallinity at increased rates which comprises effecting the polymerization in an inert organic liquid vehicle at a temperature of 20–200° C. and a pressure of 0–20,000 p.s.i.g. and in the presence of a catalytic mixture of aluminum metal, aluminum chloride, an alkali metal fluoride and a titanium compound from the group consisting of titanium tetrahalides and titanium tetraalkoxides wherein each alkoxide group contains 1–18 carbon atoms, said aluminum chloride amounting to 0.1–2 molar equivalents per gram atom of aluminum metal, said alkali metal fluoride amounting to 1–10 molar equivalents per gram atom of aluminum metal, and said titanium compound amounting to .01–10 molar equivalents per gram atom of aluminum metal.

2. In the polymerization of at least one normally gaseous α-monoolefin to form solid polymer, the improvement in preparing polymer of exceptional crystallinity at increased rates which comprises effecting the polymerization in an inert organic liquid vehicle at a temperature of 20–200° C. and a pressure of 0–20,000 p.s.i.g. and in the presence of a catalytic mixture of aluminum metal, aluminum chloride, an alkali metal fluoride and a titanium tetrahalide, said aluminum chloride amounting to 0.1–2 molar equivalents per gram atom of aluminum metal, said alkali metal fluoride amounting to 1–10 molar equivalents per gram atom of aluminum metal, and said titanium tetrahalide amounting to .01–10 molar equivalents per gram atom of aluminum metal.

3. In the polymerization of at least one normally gaseous α-monoolefin to form solid polymer, the improvement in preparing polymer of exceptional crystallinity at increased rates which comprises effecting the polymerization in an inert organic liquid vehicle at a temperature of 20–200° C. and a pressure of 0–20,000 p.s.i.g. and in the presence of a catalytic mixture of aluminum metal, aluminum chloride, an alkali metal fluoride and a titanium tetraalkoxide wherein each alkoxide group contains 1–18 carbon atoms, said aluminum chloride amounting to 0.1–2 molar equivalents per gram atom of aluminum metal, said alkali metal fluoride amounting to 1–10 molar equivalents per gram atom of aluminum metal, and said titanium tetraalkoxide amounting to .01–10 molar equivalents per gram atom of aluminum metal.

4. In the polymerization of at least one normally gaseous α-monoolefin from the group consisting of ethylene and propylene to form solid polymer, the improvement in preparing polymer of exceptional crystallinity at increased rates which comprises effecting the polymerization in an inert organic liquid vehicle at a temperature of 40–160° C. and a pressure of 10–1000 p.s.i.g. and in the presence of a catalytic mixture of aluminum metal, aluminum chloride, sodium fluoride and a titanium tetrahalide, said aluminum chloride amounting to 0.1–2 molar equivalents per gram atom of aluminum metal, said sodium fluoride amounting to 1–6 molar equivalents per gram atom of aluminum metal, and said titanium tetrahalide amounting to .01–10 molar equivalents per gram atom of aluminum metal.

5. In the polymerization of at least one normally gaseous α-monoolefin from the group consisting of ethylene and propylene to form solid polymer, the improvement in preparing polymer of exceptional crystallinity at increased rates which comprises effecting the polymerization in an inert organic liquid vehicle at a temperature of 40–160° C. and a pressure of 10–1000 p.s.i.g. and in the presence of a catalytic mixture of aluminum metal, aluminum chloride, sodium fluoride and a titanium tetraalkoxide wherein each alkoxide group contains 1–18 carbon atoms, said aluminum chloride amounting to 0.1–2 molar equivalents per gram atom of aluminum metal, said sodium fluoride amounting to 1–6 molar equivalents per gram atom of aluminum metal, and said titanium tetraalkoxide amounting to .01–10 molar equivalents per gram atom of aluminum metal.

6. The process of polymerizing ethylene which comprises contacting ethylene, in an inert organic liquid vehicle and at a temperature of 40–160° C. and a pressure of 10–1000 p.s.i.g., with a catalytic mixture of aluminum metal, aluminum chloride, sodium fluoride and titanium tetrachloride, said aluminum chloride amounting to 0.1–2.0 molar equivalents per gram atom of aluminum metal, said sodium fluoride amounting to 1–6 molar equivalents per gram atom of aluminum, and said titanium tetrachloride amounting to .01–10 molar equivalents per gram atom of aluminum metal.

7. The process of polymerizing ethylene which comprises contacting ethylene, in an inert organic liquid vehicle and at a temperature of 40–160° C. and a pressure of 10–1000 p.s.i.g., with a catalytic mixture of aluminum metal, aluminum chloride, sodium fluoride and 2-ethylhexyl titanate, said aluminum chloride amounting to 0.1–2.0 molar equivalents per gram atom of aluminum metal, said sodium fluoride amounting to 1–6 molar equivalents per gram atom of aluminum, and said 2-ethylhexyl titanate amounting to .01–10 molar equivalents per gram atom of aluminum metal.

8. The process of polymerizing propylene which comprises contacting propylene, in an inert organic liquid vehicle and at a temperature of 40–160° C. and a pressure of 10–1000 p.s.i.g., with a catalytic mixture of aluminum metal, aluminum chloride, sodium fluoride and titanium tetrachloride, said aluminum chloride amounting to 0.1–2.0 molar equivalents per gram atom of aluminum, said sodium fluoride amounting to 1–6 molar equivalents per gram atom of aluminum, and said titanium tetrachloride amounting to .01–10 molar equivalents per gram atom of aluminum metal.

9. The process of copolymerizing ethylene and propylene which comprises contacting a mixture of ethylene and propylene, in an inert organic liquid vehicle and at a temperature of 40–160° C. and a pressure of 10–1000 p.s.i.g., with a catalytic mixture of aluminum metal, aluminum chloride, sodium fluoride and titanium tetrachloride, said aluminum chloride amounting to 0.1–2.0 molar equivalents per gram atom of aluminum, said sodium fluoride amounting to 1–6 molar equivalents per gram atom of aluminum, and said titanium tetrachloride amounting to .01–10 molar equivalents per gram atom of aluminum metal.

References Cited in the file of this patent

UNITED STATES PATENTS 2,416,106　Linn et al. _____ Feb. 18, 1947

FOREIGN PATENTS 538,782　Belgium _____ Dec. 6, 1955
874,215　Germany _____ Apr. 20, 1953